June 25, 1929.  A. H. PHILLIPS  1,718,799
MANIFOLDING BOOK
Filed Dec. 23, 1922  4 Sheets-Sheet 1

INVENTOR
Arthur H. Phillips
BY
Duell, Warfield & Duell
ATTORNEY

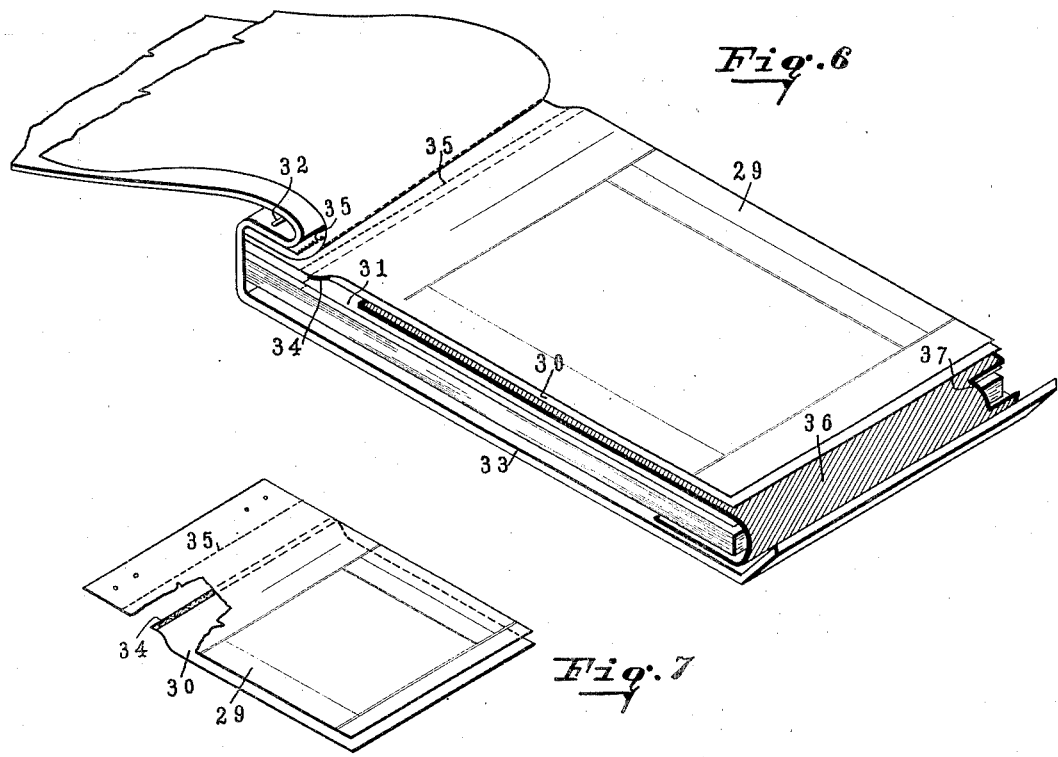
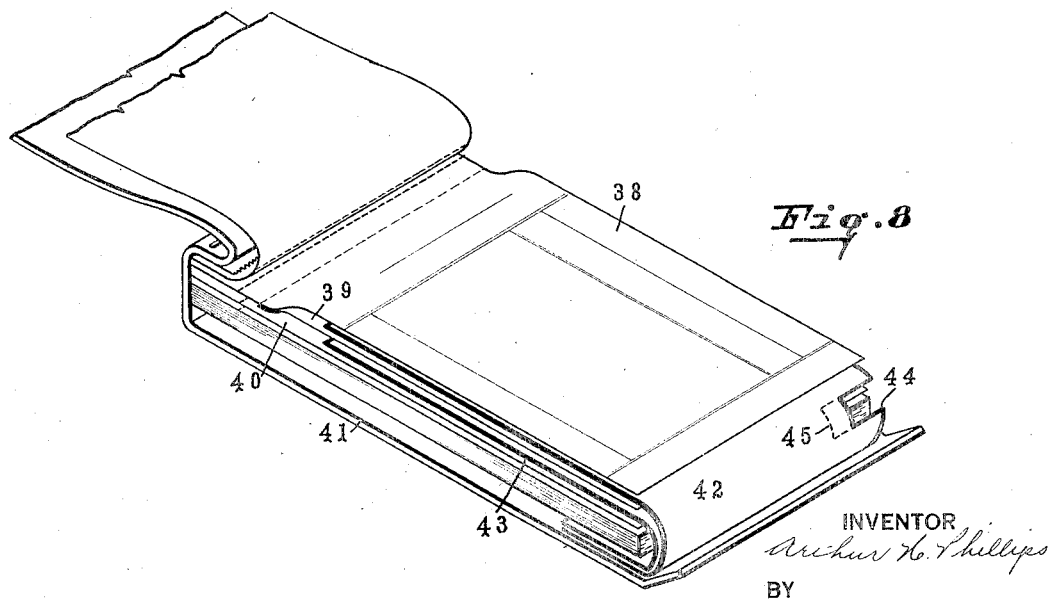

June 25, 1929.  A. H. PHILLIPS  1,718,799
MANIFOLDING BOOK
Filed Dec. 23, 1922  4 Sheets-Sheet 4

INVENTOR
Arthur H. Phillips
BY
Duell, Warfield & Duell
ATTORNEY

Patented June 25, 1929.

1,718,799

UNITED STATES PATENT OFFICE.

ARTHUR H. PHILLIPS, OF HEMPSTEAD, NEW YORK, ASSIGNOR TO AMERICAN SALES BOOK COMPANY, LIMITED, OF TORONTO, CANADA, A CORPORATION OF ONTARIO.

MANIFOLDING BOOK.

Application filed December 23, 1922. Serial No. 608,620.

This invention relates to an improvement in manifolding books.

An object of the invention is to provide an improved form of manifolding salesbook in accordance with which a plurality of copies may be made, some of which may be allowed to remain in the book and others of which may be removed from the book as a unit.

A further object is to provide an improved manifolding salesbook which will be economical to manufacture and simple in operation.

Other objects will be in part obvious and will in part appear hereinafter.

The invention accordingly consists in the features of construction, combinations of elements and arrangement of parts which will be exemplified in the construction hereinafter set forth, and the scope of the application of which will be indicated in the following claims.

Figure 1:
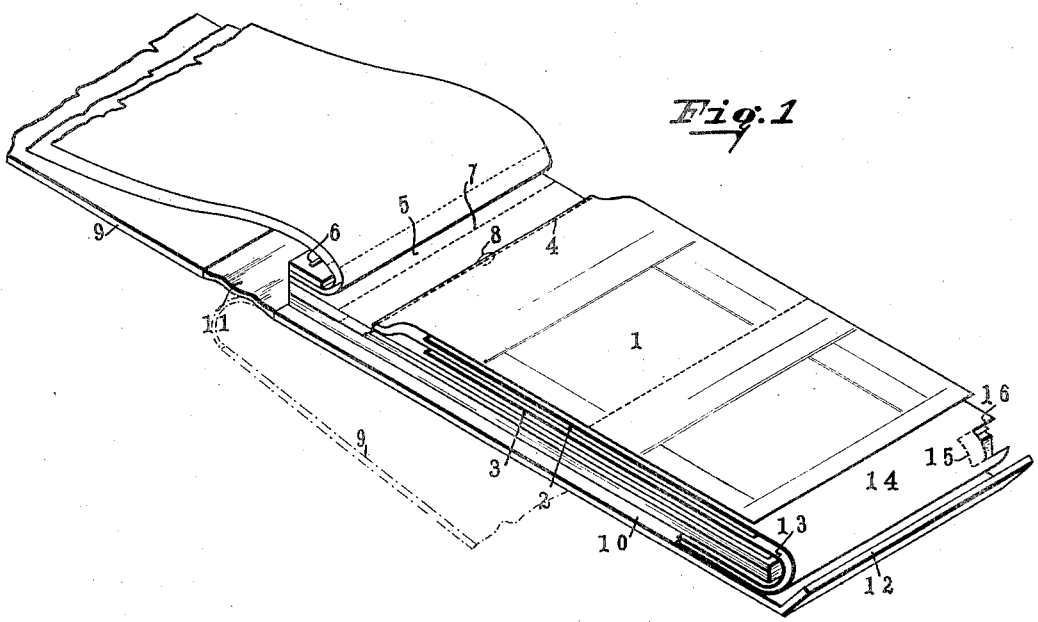
Figure 2:
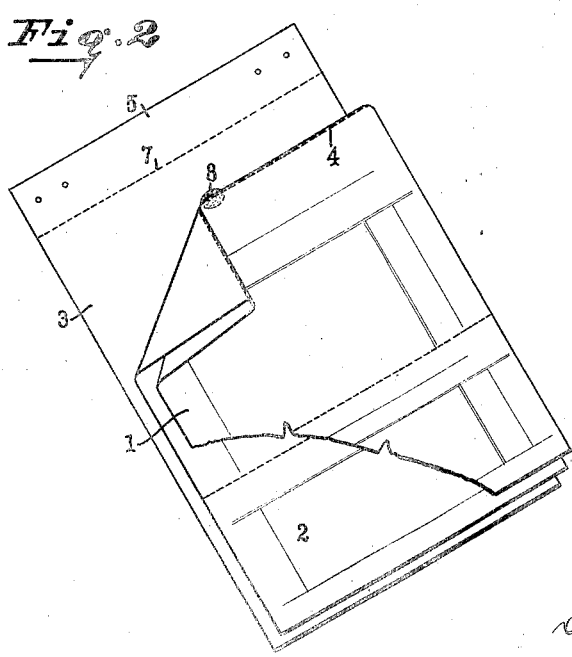
Figure 3:
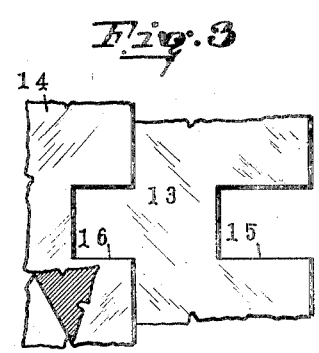
Figure 4:
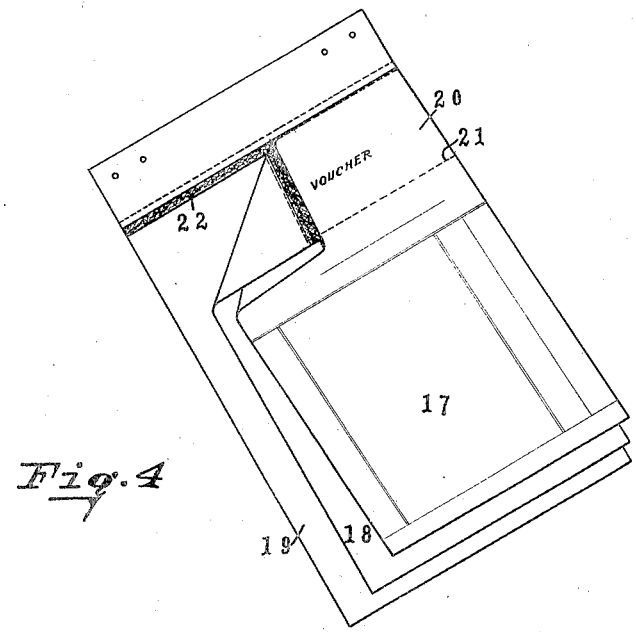
Figure 5:
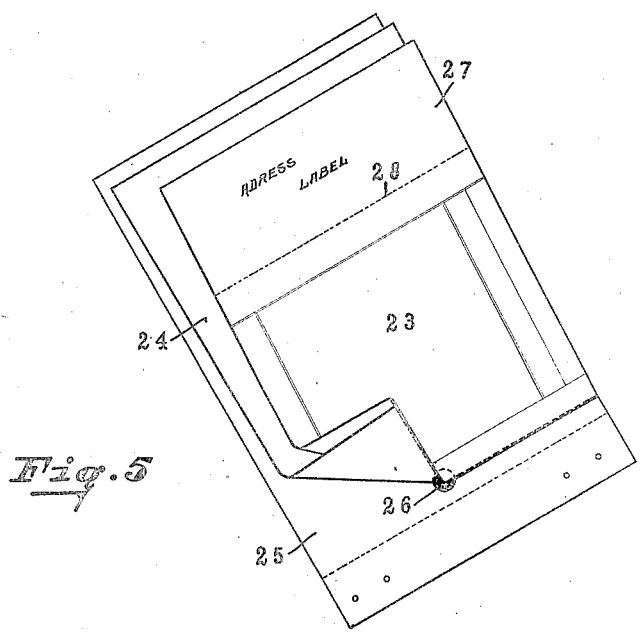

In the accompanying drawings forming a part of this specification wherein similar reference characters refer to similar parts throughout the several views, Figure 1 is a perspective view of an embodiment of the invention, Fig. 2 is a similar view of one of the units, Fig. 3 is a plan view of portions of the transfer sheets, Figs. 4 and 5 are perspective views of alternate forms of units, Fig. 6 is a perspective view of an alternate arrangement, Fig. 7 is a perspective view of one of the units shown in Fig. 6, Figs. 8, 9 and 10 are perspective views of other alternate constructions.

In the embodiment of the invention illustrated in Figs. 1, 2 and 3, the book is composed of a plurality of sets of leaves, certain of which are bound within the stub of the book and others of which are attached to the bound layers, independent of the stub. In the form illustrated, each set comprises a single bound leaf and to this bound leaf there is attached a sheet folded in the middle to form two other leaves. This attachment may be by any convenient means.

In the form which is particularly illustrated in Fig. 2, it will be noticed that the set comprises three leaves, an original 1, a duplicate 2, and a triplicate 3. The leaves may be provided with any desired printing matter and ruling, and the different leaves of each set may be alike if desired. As illustrated in this embodiment, the original and duplicate are continuous forming a single sheet of material folded intermediate its ends, and it may have a line of partial separation at the fold to facilitate the subsequent separation of the two sheets.

The sheet 1—2 including the original and duplicate is connected to the triplicate 3 at the fold.

The triplicate extends beyond the original to provide an extension 5 by means of which the different sets may be bound together into a stub as by staples 6.

If it is desired to facilitate the removal of the bound sheet also from the book, a line of partial separation 7 may be provided.

The connection between the sheet including the original and duplicate and the triplicate, is in the present instance by means of a spot 8 of adhesive, and the said spot is midway of the fold, although it is obvious that it might extend the full width of the sheet 1—2, if desired. The attachment is such however, that the sheet 1—2, may be easily detached from the sheet 3. The book includes also a front cover 9 and a back cover 10, which have a flexible connection 11, and the back cover is connected to the pad composed of the units, in any suitable manner, as for instance by the staples 6 before mentioned. The back cover 10 at the end remote from the binding of the book preferably has an angular extension 12, which protects the free ends of the leaves and the transfer sheets to be described.

All of the leaves of the units are opaque in the present instance, and since there are three leaves, namely an original and two duplicates, two transfer sheets 13 and 14 are provided. These sheets are secured to the back cover 10, at the end remote from the binding in any suitable manner, and they may be independently connected to the cover, or the sheet 14 may be connected to the sheet 13, which in turn is connected to the cover. The extension 12 is of sufficient width to provide a guard for the fold of the transfer sheets.

Where a plurality of superposed transfer sheets are used in a book, it is desirable that means be provided whereby they may be readily separated in the manipulation of the book. In accordance with this invention, it has been discovered that this may be readily accomplished by notching one of the transfer sheets in such a manner as to expose a portion of the other beneath the notch. In order, furthermore, to permit the separation of the transfer sheets from the record sheets to permit the manipulation of the transfer sheets, it is desirable to notch each transfer sheet. In accordance with this invention, therefore, both carbons are notched but one of these notches is arranged to expose a portion of the other sheet through it. This may be readily accomplished by placing both notches in registry, but making one notch deeper than the other.

In the particular embodiment, each sheet is notched at one side edge, at the fold, as indicated at 15 and 16 respectively, to facilitate the removal of the sheets from between the leaves. In the present instance the notches 15 and 16 are at the right hand side of the book, and they are designed to be engaged by the point of a pencil, to facilitate the insertion of the pencil beneath the sheets, to remove and replace them from between the sheets. After a sale has been made, and the saleslip, including an original and one or more duplicates, has been written, the pencil may be inserted through the notches 15 and 16 beneath the sheet 13, and both sheets may be drawn out from between the leaves. In replacing the sheets, the new original and duplicate are lifted, and the pencil is inserted through the notch 15 of the sheet 13, which notch is of greater depth than the notch 16 of the sheet 14, and the sheet is turned up onto the triplicate. The duplicate is now placed on the sheet 13, after which the pencil is inserted beneath the sheet 14, through the notch 16, and the sheet 14 is lifted up onto the face of the duplicate. The transfer sheets have transfer material on their under faces only, because all of the leaves are opaque. It will be obvious however, that by making the duplicate of translucent paper, of so-called tissue paper, a single transfer sheet might be used, having transfer material on both faces.

Any desired arrangement of form, that is ruling and printed matter may be used with the improved book. As for instance in Fig. 4, there is shown an arrangement wherein each leaf of the unit, the leaves of which are indicated at 17, 18 and 19 has a voucher 20 at the top thereof, and a line of partial separation 21 between the voucher and the body of the leaf. In this arrangement also the sheet 17—18 carrying the original and duplicate is connected to the triplicate throughout the width thereof by a line of adhesive 22. The arrangement and connection of the leaves is otherwise the same.

In the embodiments of the invention just described the units are bound at one end of the book, and the assembly of each unit is connected at the bound end of the book. This arrangement leaves the opposite ends of the leaves free, so that the transfer sheets may be arranged at the said end. In Figs. 1 to 4 inclusive, the connection is at the tops of the leaves. It is obvious however, that the connection might be at the opposite end, leaving the top ends of the leaves of the units free. In this construction, as shown in Fig. 5, the units are composed of originals 23, duplicates 24, and triplicates 25, and the sheet comprising the original and the duplicate is so printed that when folded, the fold will be at the lower end of the folded sheet. The sheet 23—24 is connected to the triplicate as indicated at 26, by a spot of adhesive, or in any other suitable manner, the connection being intermediate the side edges of the sheet and near the bottom of the triplicate. The extended ends of the triplicates are bound together, thus making the binding at the bottom of the book instead of at the top, and leaving the top ends of the leaves free. The book containing an assemblage of units shown in Fig. 5, may be provided with the front and back covers similar to those shown in Fig. 1, and with transfer sheets similar to the sheets 13—14. In this instance, however, the transfer sheets will be connected to the back cover at the top, and the fold containing the notches 15 and 16 will be at the top of the book. If desired, the transfer sheets may be bound with the units. The leaves of the units shown in Fig. 5 are especially adapted for a certain character of form, as for instance forms having address labels to be detached from the body of the leaf or slip. As shown in Fig. 5, the address label 27 of each leaf at the top thereof is adapted to be separated from the lower part, a line 28 of partial separation being provided between the address label and the said body.

In the embodiment of the invention shown in Fig. 6, the book has an assemblage of units, each of which is composed of an original 29, a duplicate 30, and a triplicate 31, the original 29 and the triplicate 31 being opaque, while the duplicate 30 is translucent. The original and the triplicate of each unit are bound together, in any suitable manner, as for instance by the wire staples 32, and the book is provided with a cover 33, corresponding to the cover 9—10—11—12 of Fig. 1. The duplicates 30 of the units are connected to the under faces of the originals 29, near the tops thereof, in any suitable manner, as for instance by a line of adhesive indicated at 34. The originals and triplicates of the units have each a line of partial separation 35 near the bound end, to facilitate the detachment of the leaves from the book. Any desired arrangement of printed matter and ruling may be used in connection with the leaves, all of the leaves of each book bearing however, a distinguishing mark common to all the leaves, while the leaves of each unit assembly have a distinguishing characteristic, common to the leaves of the unit, and different from the leaves of the other units. A sheet 36 of transfer material is secured to the back cover, at the opposite end from the staples 32, to fold between the leaves of the units, and the sheet in the present instance has transfer material on both faces. In use the sheet is arranged between the duplicate 30 and the triplicate 31, so that when the original is written upon, both duplicate and triplicate will be impressed. The sheet 36 is notched at one side edge at the fold, as indicated at 37, to facilitate the removal of the sheet from between the leaves. The triplicate may be left in the book as a permanent record, or it may be removed to be preserved under other conditions, if desired.

The leaves of the units may be all opaque if desired, as shown in Fig. 8, wherein the book is composed of units, assembled in the same manner as in Fig. 6, all of the leaves of each unit, however, indicated at 38, 39 and 40, being opaque. The original 38 and the triplicate 40 of all of the units are bound together, and the book has the cover 41 corresponding to the cover 33. Since all of the leaves of each unit are opaque, two sheets 42 and 43 of transfer material are used, the said sheets being secured to the back cover, in any suitable manner. Each sheet is notched as indicated at 44 and 45 respectively, at one side edge at the fold. This arrangement is substantially the same as that shown in Fig. 6, the duplicate being carried by the original, and secured thereto in any suitable or desired manner, differing only in that the duplicate is opaque instead of translucent.

Figure 9:
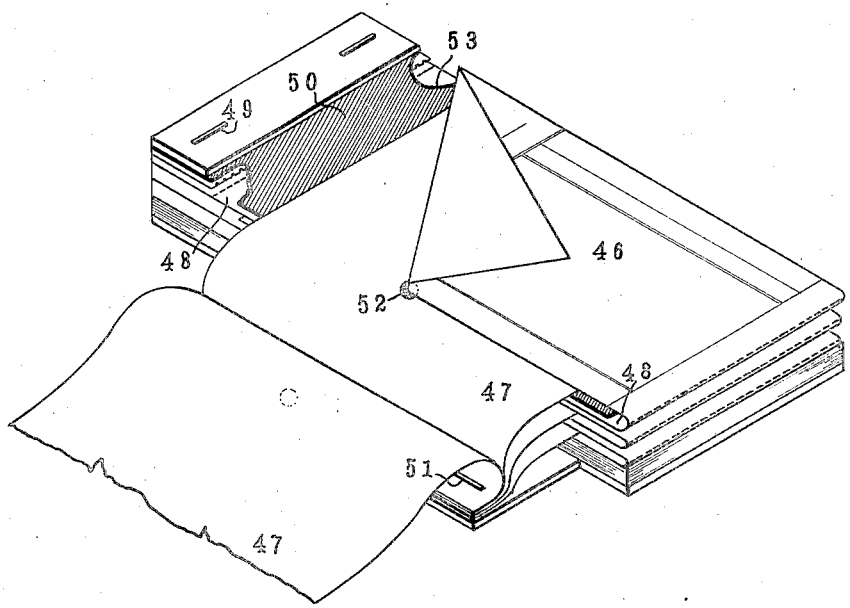

In the embodiments of the invention previously shown and described, one leaf of each unit is designed for a permanent record, and the units are so connected that one leaf of each unit is bound together with the corresponding leaves of the other units, so that when the originals and the duplicates, if duplicates are used, have been removed, the triplicates will remain to form the permanent record. The remaining leaves of the units, are connected together, so that they may be detached as a whole. In these arrangements all of the leaves of each unit are bound together, in that all have a connection with the binding some directly, and others indirectly through other leaves of the unit. In Fig. 9 there is shown a construction wherein those leaves of the units which are to form the permament record are bound together, and wherein the remaining leaves are connected to the first named leaves, but in addition are bound together, and independently of the binding of the first named leaves. In this arrangement, each unit is composed of an original 46, a duplicate 47, and a triplicate 48, the duplicates constituting the permanent record and being in the present instance translucent. Each original 46 is connected to the triplicate 48 of the unit, and the triplicates are bound together at the ends remote from the connections with the originals in any suitable manner. In the present instance the triplicates are bound by wire staples 49, and a sheet 50 having transfer material on both faces is bound with the triplicates. The connection between the originals and the triplicates of each unit is at the end remote from the binding, so that the transfer sheets may be easily placed between the leaves of the units. All of the duplicates 47 are bound together, as indicated at 51, and they are interleaved between the originals and triplicates, a duplicate being interleaved between the original and triplicate of each unit. All of the duplicates, and all of the triplicates with the connected originals are bound at one end into independent books, which are afterwards interleaved, and the duplicate of each unit is connected to the original of the unit by a connection indicated at 52, which may be a spot or line of adhesive. The binding of the book of duplicates is at the side of the book of triplicates, and the connection between the originals and the duplicates does not interfere with the placing of the transfer sheet between the duplicate and triplicate. The transfer sheet has one side edge notched as indicated at 53 adjacent to the binding, to facilitate the removal of the same from between the leaves of the units. In using the improved book, the transfer sheet is placed between the topmost duplicate and the adjacent triplicate. After the entry is made, the transfer sheet is flipped out over the top of the book of triplicates, and the original is separated from the duplicate, and removed with the triplicate. The used duplicate is then turned over out of the way, and the transfer sheet is inserted between the next duplicate and its triplicate. It is obvious that if desired, the leaves 47 might be used as duplicates, being removed with the leaves 46, leaving the leaves 48 as a permanent record. It is also obvious that with this method of assembling, the originals might be bound with the triplicates, as shown in Fig. 6, in which case the transfer sheet 50 would be connected with the lower end of the book, as shown in Fig. 6.

Figure 10:
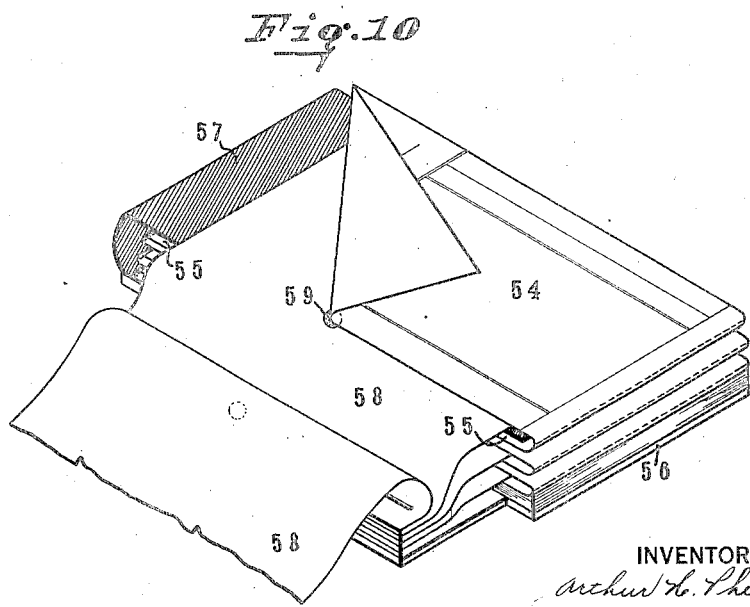

The manner of assembling shown in Fig. 9 may be used with the zigzag or continuous arrangement of originals and duplicates, as shown in Fig. 10. In this arrangement the originals 54 and the duplicates 55 form a continuous strip, the duplicates alternating with the originals, and the strip is folded into a zigzag relation, each duplicate lying between two originals. A suitable back or cover 56 is connected with the lowermost leaf, and at one end, namely at that end of the book where the originals are free from the duplicates, that is at the end remote from the connection between the originals and duplicates, a sheet 57 having transfer material on both faces is connected to the cover 56, so that it may be folded between the originals and the duplicates. This zigzag arrangement provides for only one duplicate, and both original and duplicate are separated from the book when an entry has been made. By providing a book of duplicates 58 of translucent material, and of the same character as those shown in Fig. 9, a third leaf may be provided for each unit. These duplicates 58 are bound together, and they are interleaved between the originals 54, the leaves 55 acting in the present instance as triplicates. The leaves 58 are connected to the originals 54, by adhesive indicated at 59, and the book is used in the same manner as that shown in Fig. 9. After the originals of either form of book have been exhausted, there remains a separately bound book of triplicates.

In any of the types shown, it is practically impossible for the user inadvertently to use a leaf of one unit, with the leaf of another unit, which would cause a disagreement in the numbers of the leaves afterwards used, unless the mistake were noticed at once and the remaining leaves of the unit removed. The leaves of the books are printed and assembled at one time and at a single operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a manner of language, might be said to fall therebetween.

Having described my invention, what I claim as new and desire to secure by Letters Patent is:

1. A set of leaves adapted for use in a manifolding device comprising, in combination, a record leaf having a stub portion by which it may be secured in a pad, and two other record leaves attached together for removal as one from the stub-provided leaf, one of said two leaves being pasted to the stub-provided leaf outside said stud portions and extending therefrom toward that end of the set opposite the stub portion.

2. A manifolding book including, in combination, a plurality of sets of record leaves of which one leaf of each set has a stub portion bound in the book, and of which two leaves of each set are attached together for removal as one from the stub-provided leaves, said two leaves of each having one of its leaves removably attached to the stub-provided leaves outside the stub portions of the latter, and extending from said stub portions toward that end of the book opposite the stub portions, and a pair of carbon leaves operatively attached to said book, each adapted separately to swing into superposed relation between said record leaves and to lie idly in superposed contact with each other when out of said relation, the one of said carbon leaves which is undermost when in operative position having an edge notch adjacent to its swinging axis, through which is exposed the face of the other carbon leaf.

3. A triplicate record manifolding book having a stub portion and three leaves extending from said stub portions toward that end of the book opposite the stub portions and a pair of carbon leaves operatively attached to said book, each adapted separately to swing into superposed relation between said record leaves and to lie idly in superposed contact with each other when out of said relation, the one of said carbon leaves which is undermost when in operative position, having an edge notch, adjacent to its swinging axis, through which is exposed the face of the other carbon leaf.

In testimony whereof I affix my signature.

ARTHUR H. PHILLIPS.